(12) United States Patent
Hanslmeier et al.

(10) Patent No.: US 11,598,413 B2
(45) Date of Patent: Mar. 7, 2023

(54) ELECTROMECHANICAL GEAR SELECTION DEVICE COMPRISING AN ACTUATOR

(71) Applicant: Hilti Aktiengesellschaft, Schaan (LI)

(72) Inventors: Xaver Hanslmeier, Mauerstetten (DE); John Van Taack-Trakranen, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 464 days.

(21) Appl. No.: 16/624,646

(22) PCT Filed: Jun. 20, 2018

(86) PCT No.: PCT/EP2018/066433
§ 371 (c)(1),
(2) Date: Dec. 19, 2019

(87) PCT Pub. No.: WO2019/002049
PCT Pub. Date: Jan. 3, 2019

(65) Prior Publication Data
US 2020/0124166 A1 Apr. 23, 2020

(30) Foreign Application Priority Data
Jun. 29, 2017 (EP) .................................... 17178600

(51) Int. Cl.
*F16H 59/04* (2006.01)
*F16H 61/00* (2006.01)
(Continued)

(52) U.S. Cl.
CPC ........... *F16H 59/041* (2013.01); *B25F 5/001* (2013.01); *F16H 61/0006* (2013.01); *F16H 61/2807* (2013.01); *F16H 63/32* (2013.01)

(58) Field of Classification Search
CPC .............. F16H 59/041; F16H 61/0006; F16H 61/2807; F16H 63/32; B25F 5/001
(Continued)

(56) References Cited

U.S. PATENT DOCUMENTS 8,981,680 B2 * 3/2015 Suda .......................... B25F 5/00
318/472
9,712,091 B2 * 7/2017 Sawano ..................... B25F 5/00
(Continued)

FOREIGN PATENT DOCUMENTS

EP 2762278 A2 8/2014
EP 3135438 A1 3/2017

OTHER PUBLICATIONS

International Search Report of PCT/EP2018/066433, dated Sep. 27, 2018.

*Primary Examiner* — Ha Dinh Ho
(74) *Attorney, Agent, or Firm* — Davidson, Davidson & Kappel, LLC

(57) ABSTRACT

A method for setting a gear in a transmission of a power tool, the power tool including an electric motor as well as a controller for setting the rotational speed of the electric motor. A transmission includes an operating device for selecting a gear in the transmission, a shift fork as well as an actuator, the operating device including a signal transmitter as well as a sensor for receiving a signal of the signal transmitter. The method includes: setting the operating device from a first position to a second position for selecting a gear in the transmission; detecting a signal by the at least one sensor according to the second position of the operating device; transmitting a signal to the controller; setting the rotational speed of the electric motor from a first value to a second value by the controller; positioning the operating device from the second position into a third position; detecting a signal by the sensor according to the third position of (Continued)

the operating device; transmitting a signal to the actuator; and setting the shift fork from a first position to a second position with the aid of the actuator for the purpose of changing from a first gear into a second gear.

8 Claims, 9 Drawing Sheets

(51) Int. Cl.
*F16H 61/28* (2006.01)
*B25F 5/00* (2006.01)
*F16H 63/32* (2006.01)

(58) Field of Classification Search
USPC .................................................. 74/473.3, 335
See application file for complete search history.

(56) References Cited

U.S. PATENT DOCUMENTS

| | | | | |
|---|---|---|---|---|
| 2012/0279736 A1* | 11/2012 | Tanimoto | .............. | B25B 21/026 |
| | | | | 173/117 |
| 2013/0126202 A1* | 5/2013 | Oomori | .................. | B25B 21/00 |
| | | | | 173/217 |
| 2013/0292147 A1 | 11/2013 | Mergener et al. | | |
| 2013/0327552 A1* | 12/2013 | Lovelass | .................. | B25F 5/02 |
| | | | | 173/176 |
| 2013/0331994 A1* | 12/2013 | Ng | ......................... | G05B 15/02 |
| | | | | 700/275 |
| 2014/0284070 A1* | 9/2014 | Ng | ............................ | B25F 5/00 |
| | | | | 173/2 |

* cited by examiner

ELECTROMECHANICAL GEAR SELECTION DEVICE COMPRISING AN ACTUATOR

The present invention relates to a method for setting a gear in a transmission of a power tool, in particular a core drill, the power tool including an electric motor for generating and transmitting a torque to the transmission as well as a controller for setting the rotational speed of the electric motor, and the transmission including an operating device for selecting a gear in the transmission, a shift fork for engaging a gear in the transmission as well as an actuator for converting a signal into a mechanical movement of the shift fork, the operating device including at least one signal transmitter as well as at least one sensor for receiving at least one signal of the at least one signal transmitter.

The present invention also relates to a power tool for carrying out the method according to the present invention. The present invention furthermore relates to a transmission for a power tool, in particular a core drill, for carrying out the method according to the present invention.

BACKGROUND

For power tools, in particular power tools which include a rotating tool, a precise coordination of the rotational speed of the tool to the tool being used is of enormous importance.

In particular, the size, the volume and the weight of the tool used are important factors. Too low a rotational speed for too large a tool results in too slow and inefficient a work progress, so that the work process as a whole takes longer. In contrast, too high a rotational speed may result in damage to the power tool or the tool.

In core drills, the precise coordination or adaptation of the rotational speed of the tool, i.e. the drill bit, to the size of the drill bit or the diameter of the drill bit is particularly important.

Core drills use cylindrical drill bits, which are able to cut holes into mineral materials, e.g. concrete or masonry, with the aid of a diamond-studded cutting edge. To be able to vary the rotational speed and torque of the drill bit for different applications, core drills usually also include a transmission which has at least two gears. The rotational speed as well as the torque of the drill bit are settable with the aid of the different gears.

Maintaining a preferably constant peripheral speed of the drill bit during the core drilling operation is extremely important for the proper and efficient course of the core drilling operation and, in particular, for a material-friendly use of the drill bit and the core drill. However, a relatively fine device coordination to the particular drill bit diameter is required for this purpose. Nevertheless, the correct coordination of the rotational speed, the torque and the correct gear to the diameter of the drill bit used in each case, with the characteristic (e.g. degree of hardness) of the material to be processed constantly changing at the same time, often presents serious problems for the user of the core drill. The core drilling operation may thus either become inefficient and slow or damage to the drill bit may occur.

In the core drills available on the market or in the core drills according to the prior art, a fine-tuning of the size (diameter), the rotational speed, the torque of the drill bit or the selected gear of the core drill is, however, either not provided at all or is implemented in a complex manner for the user of the core drill.

SUMMARY OF THE INVENTION

An object of the present invention is therefore to solve the aforementioned problem.

The present invention provides a method for setting a gear in a transmission of a power tool, in particular a core drill, the power tool including an electric motor for generating and transmitting a torque to the transmission as well as a controller for setting the rotational speed of the electric motor, and the transmission including an operating device for selecting a gear in the transmission, a shift fork for engaging a gear in the transmission as well as an actuator for converting a signal into a mechanical movement of the shift fork, the operating device including at least one signal transmitter as well as at least one sensor for receiving at least one signal of the at least one signal transmitter.

The present invention also provides a power tool for carrying out the method according to the present invention as well as a transmission for a power tool, in particular a core drill, for carrying out the method according to the present invention.

According to the present invention, it is provided that the method includes the following method steps:

Setting the operating device from a first position to a second position for selecting a gear in the transmission;

Detecting a signal via the at least one sensor according to the second position of the operating device;

Transmitting a signal to the controller;

Setting the rotational speed of the electric motor from a first value to a second value with the aid of the controller;

Positioning the operating device from the second position into a third position;

Detecting a signal by the at least one sensor according to the third position of the operating device;

Transmitting a signal to the actuator; and

Setting the shift fork from a first position to a second position with the aid of the actuator for changing from a first gear to a second gear.

The present invention also provides a power tool for carrying out the method according to the present invention, the power tool including a transmission, an electric motor for generating and transmitting a torque to the transmission, a controller for setting the rotational speed of the electric motor, an operating device for selecting a gear in the transmission, a shift fork for engaging a gear in the transmission and an actuator for converting a signal into a mechanical movement of the shift fork, the operating device including at least one signal transmitter as well as at least one sensor for receiving at least one signal of the at least one signal transmitter.

According to one advantageous specific embodiment of the present invention, it may be possible for the signal transmitter to be designed in the form of a magnet and the sensor to be designed in the form of a Hall sensor. However, it is also possible that any other suitable type of signal transmitter and sensor is used.

According to one advantageous specific embodiment of the present invention, it may be possible that a shifting energy store is contained in the transmission, whereby a force may be applied to a shift fork of the transmission to pretension the shift fork for a transition from a first position into a second position. The shifting energy store may be designed as a spring element. During a gear selection operation, a new gear may be preselected hereby, so that the new gear is set as soon as the transmission is able to do so. This is advantageous, in particular if the constellation of the toothed wheels with respect to each other within the transmission does not immediately permit a new gear to be set.

The present invention also provides a transmission for a power tool, in particular a core drill, for carrying out the method according to the present invention.

Other advantages result from the following description of the figures. The figures illustrate different exemplary embodiments of the present invention. The figures, the description and the claims contain numerous features in combination. Those skilled in the art will advantageously also consider the features individually and combine them to form other meaningful combinations.

BRIEF DESCRIPTION OF THE DRAWINGS

In the figures, identical and equivalent components are provided with identical reference numerals.

DETAILED DESCRIPTION

Figure 1:
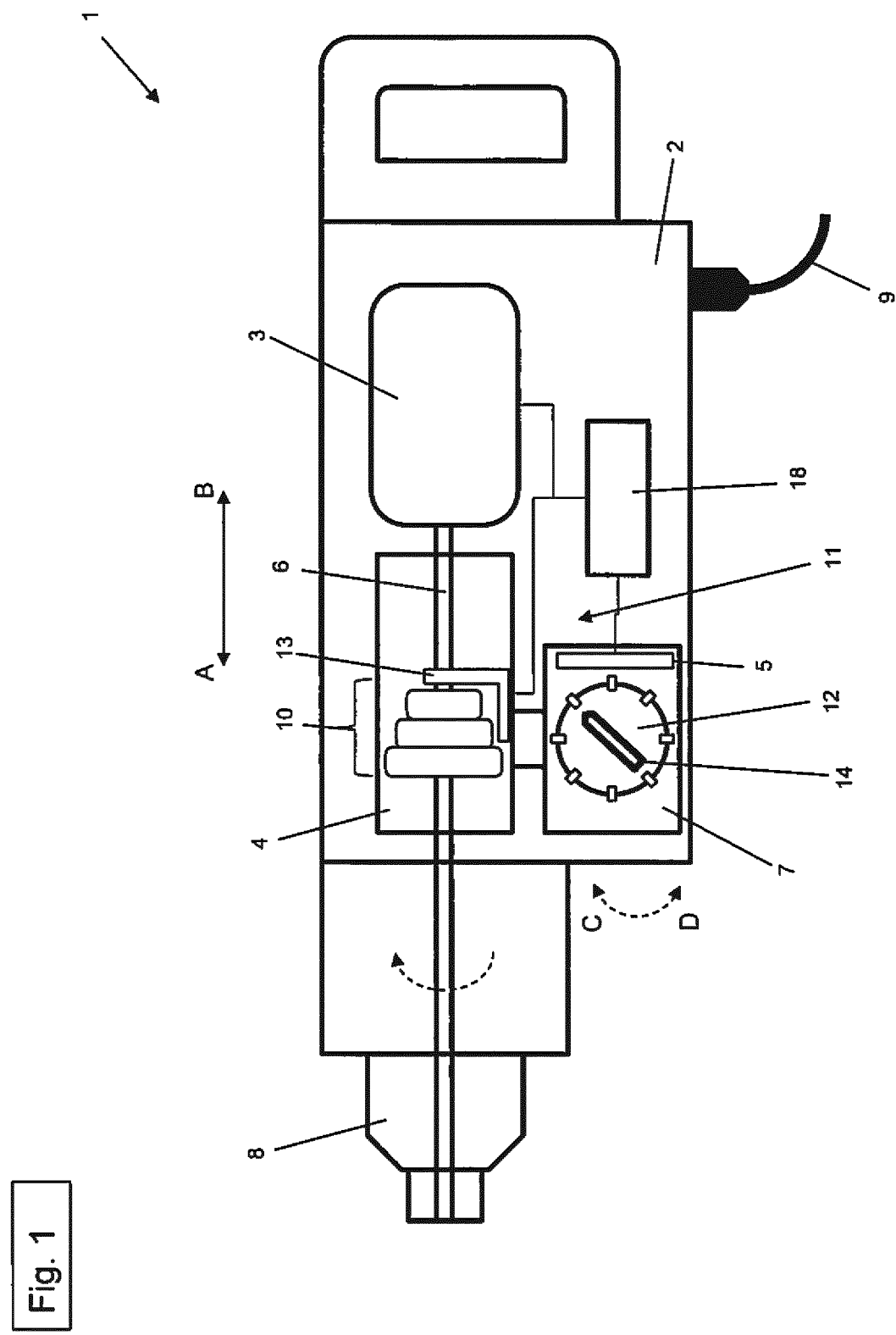
FIG. 1 shows a schematic representation of a power tool according to the present invention, including a transmission according to the present invention, an electric motor, a controller and an operating device.

FIG. 1 shows one specific embodiment of a power tool 1 according to the present invention in a design of a core drill.

Power tool 1 designed as a core drill essentially includes a housing 2, an electric motor 3, a transmission 4, a controller 18, an output shaft 6, an operating device 7 and a tool holder 8. As is apparent from FIG. 1, electric motor 3, transmission 4, controller 18 and output shaft 6 are positioned in the interior of housing 2. Operating device 7 is positioned on housing 2 so that it may be operated by a user from the outside. A power cord 9 for supplying power tool 1 with electrical current is indicated on housing 2.

Electric motor 3 is used to generate a torque, which is transmitted to tool holder 8 via output shaft 6 and transmission 4. Tool holder 8 is used to receive and hold a tool, with the aid of which a material (e.g. concrete) may be processed. In the case of the design of power tool 1 in the form of a core drill, the tool may be a drill bit. Neither the tool nor the material is illustrated in the figures.

Controller 18 is used, among other things, to set and monitor the rotational speed of electric motor 3. For this purpose, controller 18 is connected to operating device 7, transmission 4 and electric motor 3; cf. FIG. 1.

Transmission 4 includes three toothed wheels 10 for the variable translation of the torque initiated by electric motor 3 to transmission 4. Although transmission 4 illustrated in the figures includes only three toothed wheels 10, it is possible to engage more than three gears in transmission 4, as illustrated in detail below. However, it is also possible for transmission 4 to include more or fewer than three toothed wheels 10.

FIGS. 3 through 6 show one exemplary embodiment of transmission 4 according to the present invention. Transmission 4 is connected to operating device 7 and essentially includes a housing 11, part of output shaft 6, an actuator 12, the three toothed wheels 10 and a shift fork 13. Actuator 12 and part of shift fork 13 are positioned in housing 11. Operating device 7 is used to select a gear in transmission 4 as well as to set a rotational speed value for electric motor 3. The setting of the rotational speed value with the aid of operating device 7 does not induce a mechanical gear change but rather an electronic one. In other words, the setting or changing of the rotational speed value with the aid of operating device 7 appears as a mechanical gear change, in which a change occurs from one toothed wheel constellation to another toothed wheel constellation. Operating device 7 includes a rotary switch 14, which may be rotated in rotation direction C or D relative to a numeric display. The user of power tool 1 designed as a core drill identifies which gear is engaged or which gear may become engaged via the dial face. Rotary switch 14 may also be referred to as a gear selection switch.

According to an alternative specific embodiment, operating device 7 may also be connected to an electronic display for the purpose of displaying the instantaneously engaged gear to the user with the aid of a screen (display).

Actuator 12 is essentially used to convert the rotational movement of rotary switch 14 in rotational direction C or D into a linear movement of shift fork 13 in direction A or B. Actuator 12 is therefore connected to shift fork 13. As described in detail below, actuator 12 receives signals for this purpose, which correspond to the position or orientation of rotary switch 14 of operating device 7 and, in turn, converts this position or orientation into a mechanical movement of shift fork 13.

Shift fork 13, in turn, is used for the actual alignment of toothed wheels 10 with respect to each other within transmission 4 to set a certain gear ratio or toothed wheel constellation in transmission 4.

In addition, operating device 7 includes a signal transmitter 15 in the form of a magnet. Alternatively, operating device 7 may also include more than one signal transmitter 15 in the form of multiple magnets. However, it is also possible that any other suitable type of signal transmitter 15 is used. According to an alternative specific embodiment, for example, a metal ring may also be provided as signal transmitter 15, as well as an induction sensor corresponding to the metal ring.

Signal transmitter 15 is used to transmit signals corresponding to the orientation, position or rotational position of rotary switch 14 of operating device 7. For this purpose, signal transmitter 15 is fixedly positioned on rotary switch 14 of operating device 7, so that signal transmitter 15 is able to output the position or rotational position of rotary switch 14 relative to operating device 7 (cf. FIG. 2).

Moreover, operating device 7 includes a number of sensors 16 in the form of Hall sensors according to the design of signal transmitter 15 as a magnet. However, it is also possible that any other suitable type of sensor 16 is used, it being coordinated to signal transmitters 15 in each case.

Figure 2:
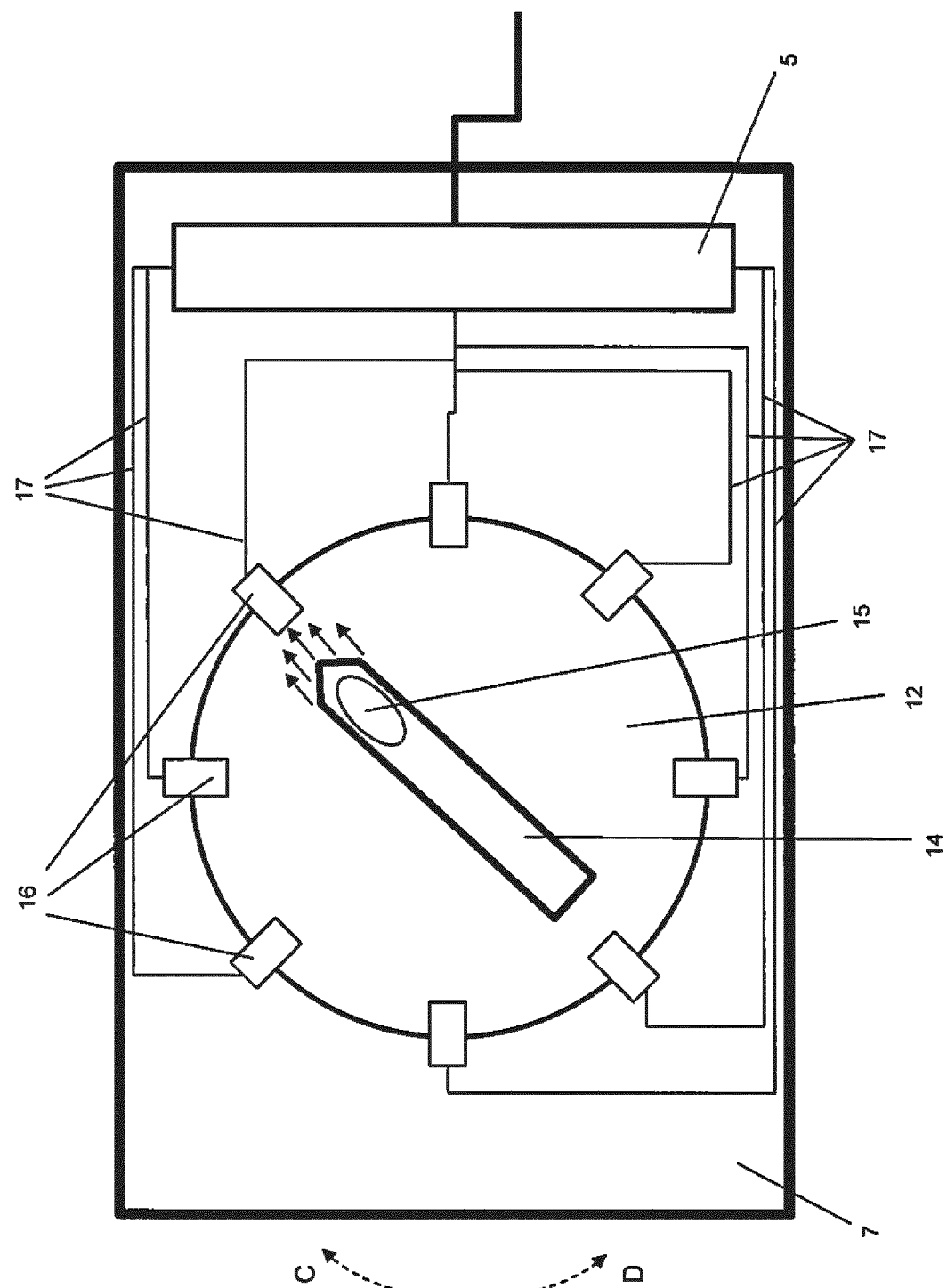
FIG. 2 shows a detailed view of a rotary switch of the operating device, including a signal transmitter and a sensor.
Figure 3:
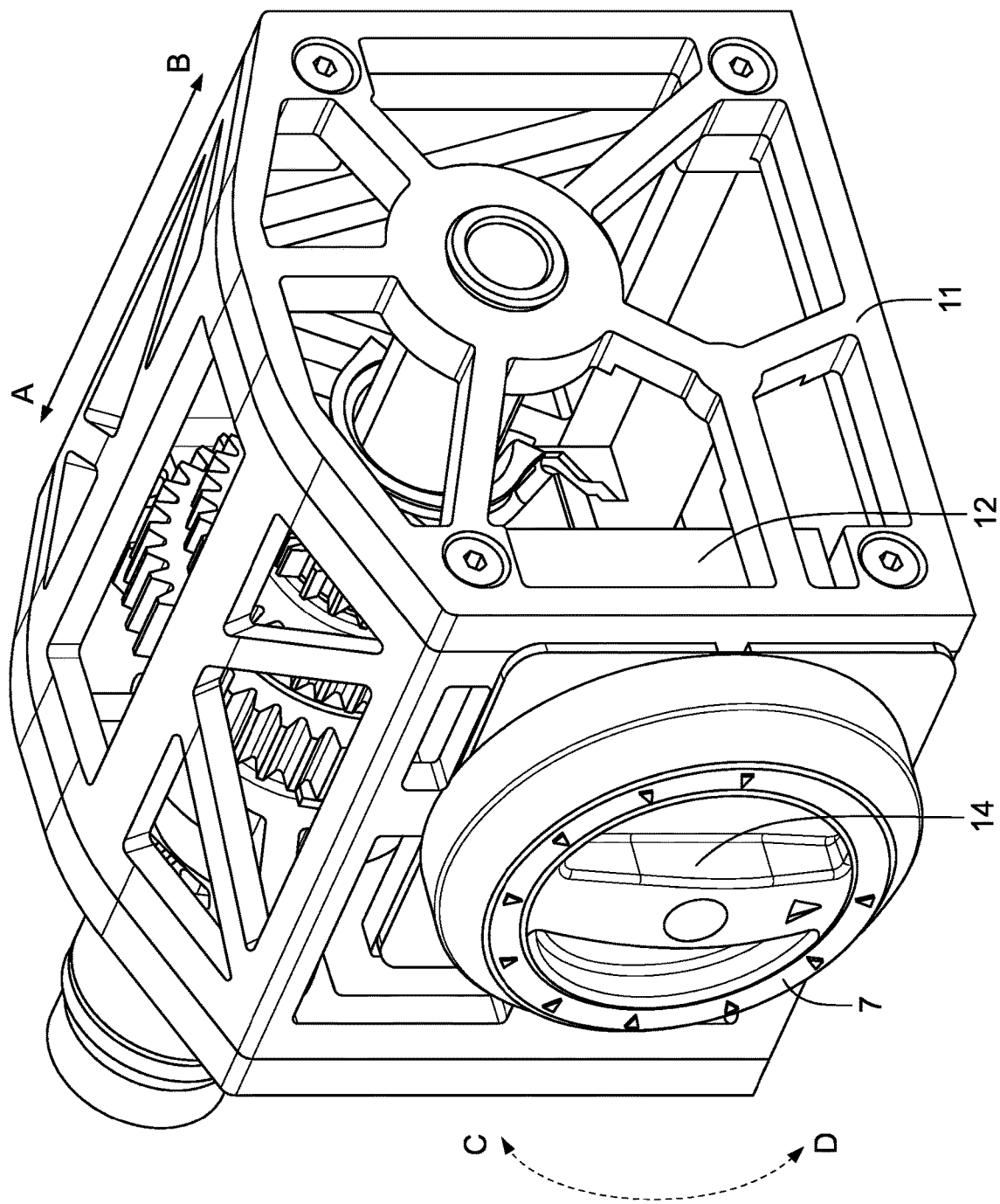
FIG. 3 shows a perspective view of a transmission according to the present invention of a power tool.
Figure 4:
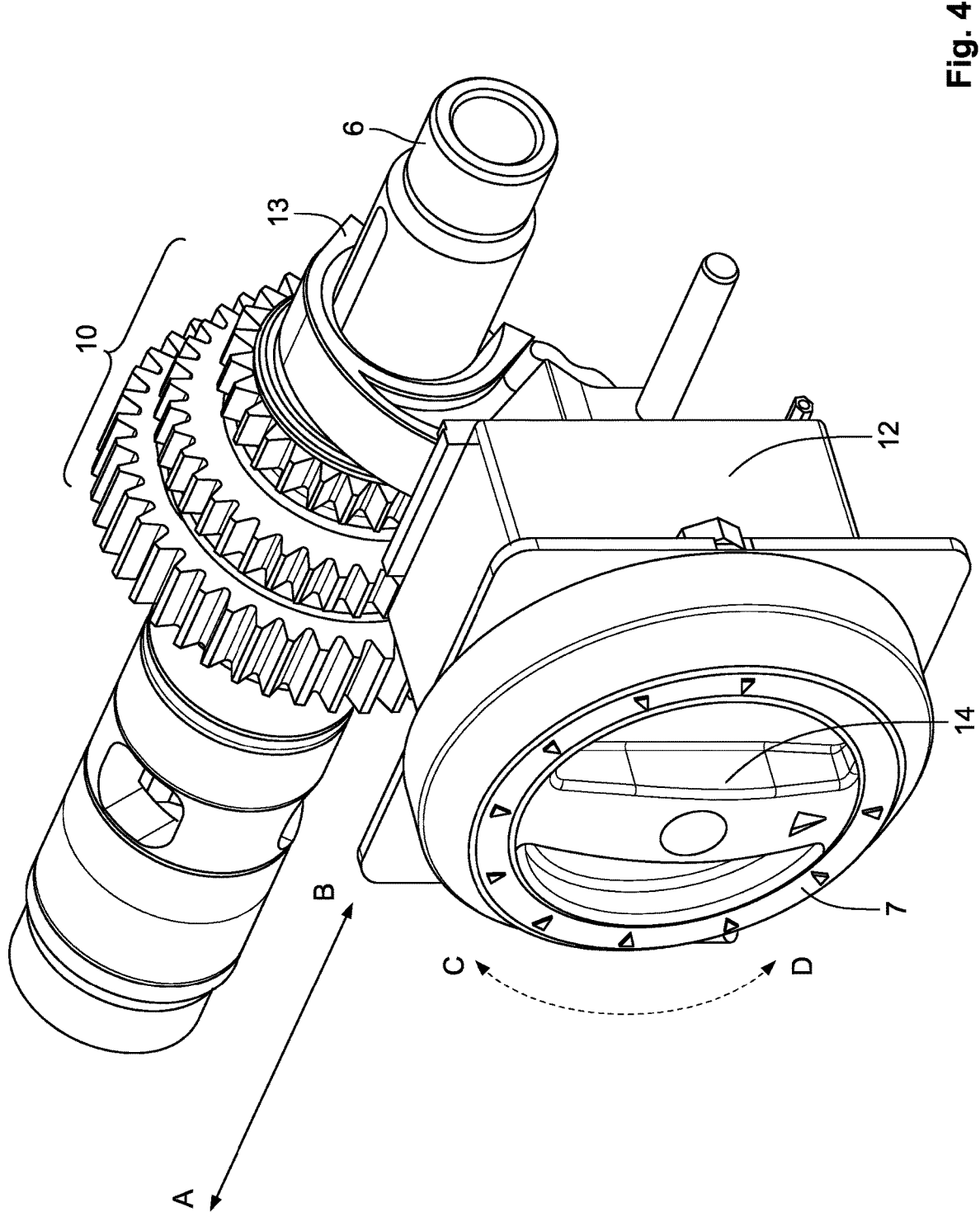
FIG. 4 shows a perspective view of the operating device, a shift fork and toothed wheels.
Figure 5:
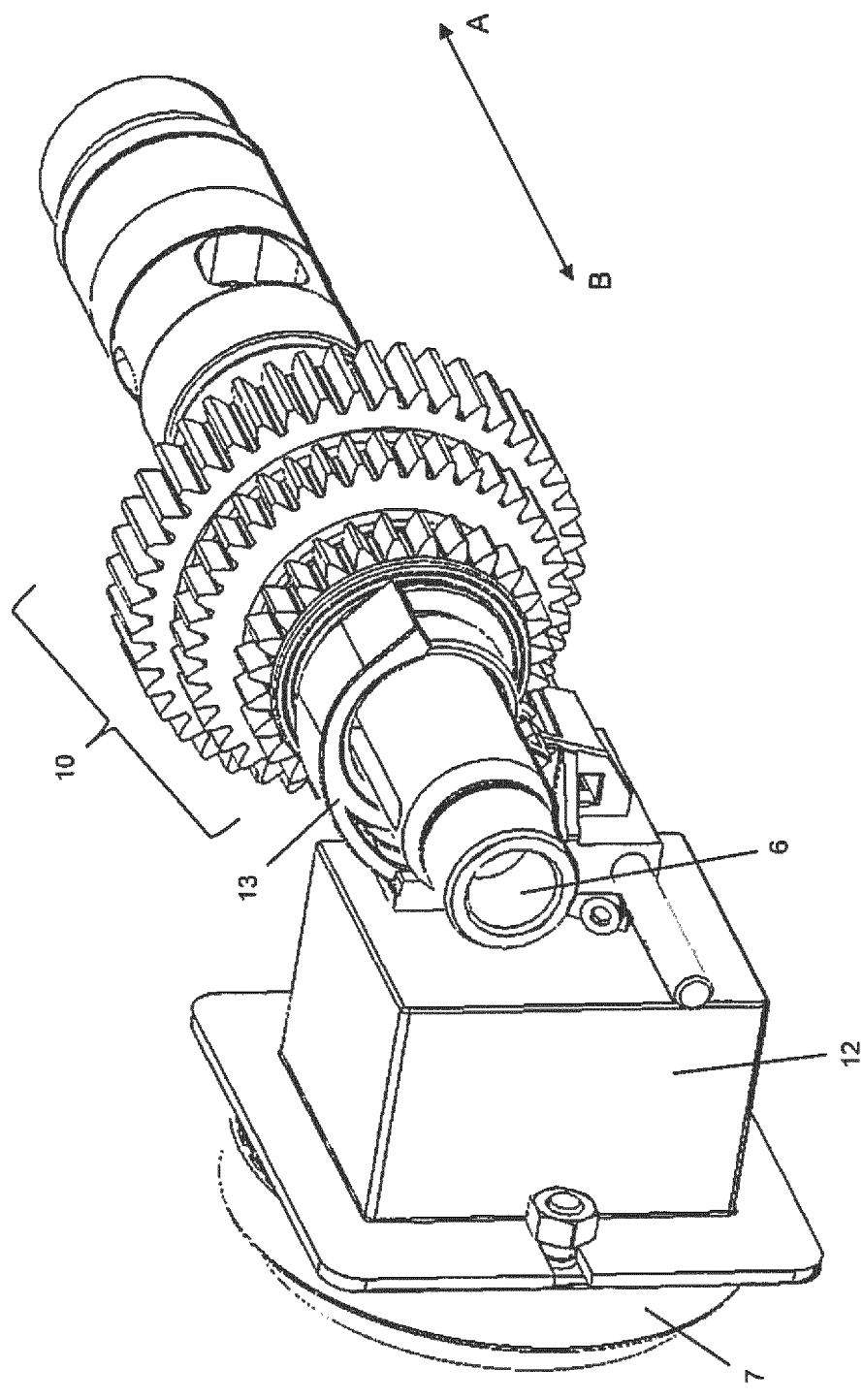
FIG. 5 shows another perspective view of the operating device, a shift fork and toothed wheels.
Figure 6:
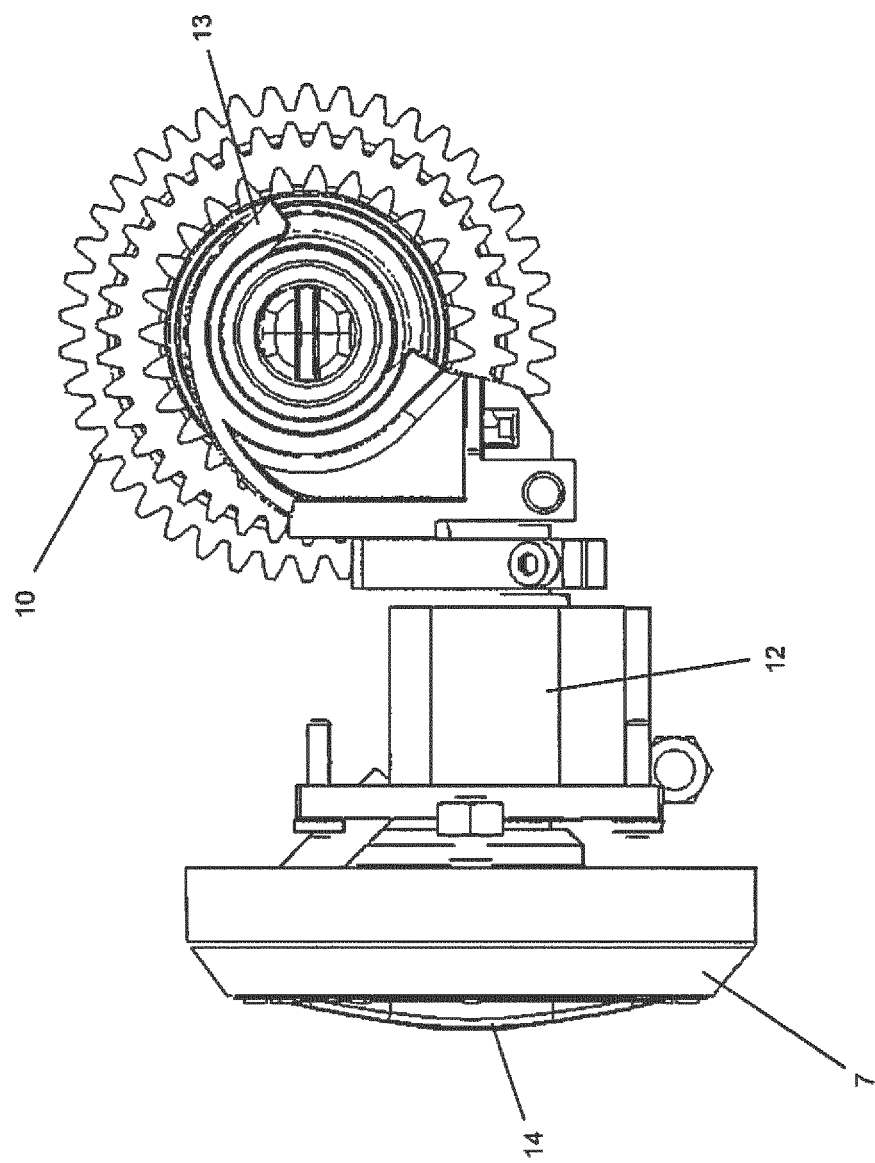
FIG. 6 shows a front view of the operating device, a shift fork and toothed wheels.
Figure 7:
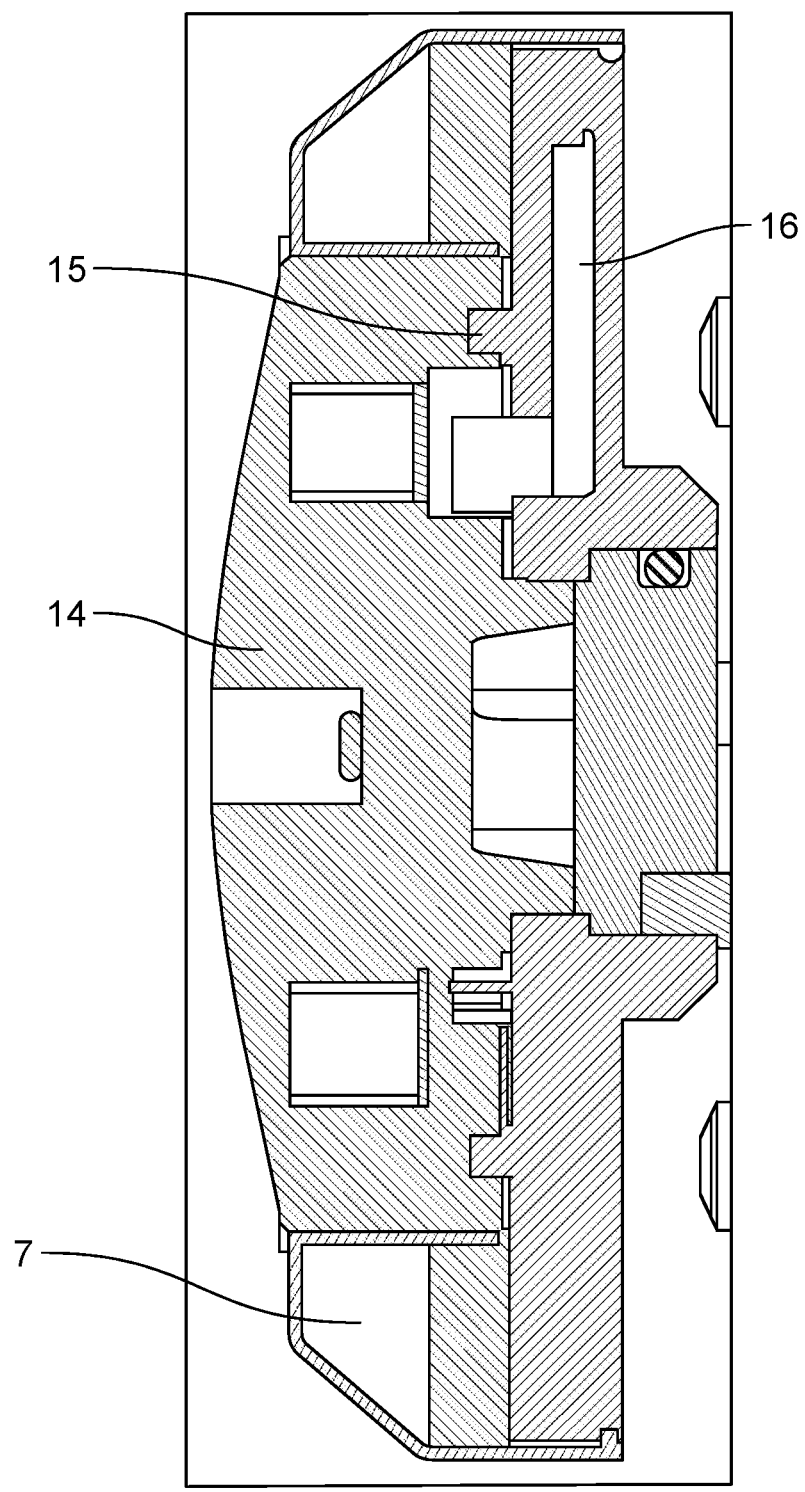
FIG. 7 shows a sectional view of the operating device.

Sensor 16 is used to receive the signal from signal transmitter 15. As illustrated in FIG. 2, eight sensors 16 are fixedly positioned in a circular manner on operating device 7 to thereby detect the magnetic field of signal transmitter 15 designed as a magnet on rotary switch 14. If rotary switch 14 is oriented in relation to one of the eight rotational positions, sensor 16 may detect signal transmitter 15 on rotary switch 14 and assign the position of rotary switch 14 to one of the eight rotational positions. However, it is also possible that more or fewer than eight rotational positions are implemented.

Each sensor 16 is connected to control unit 5 via a cable 17 to transmit the received signals from signal transmitter 15 to control unit 5 (cf. FIG. 2). Control unit 5, in turn, is connected to a controller 18 of electric motor 3 (cf. FIG. 1). Alternatively, control unit 5 is also connected directly to electric motor 3. The connection is used to transmit a corresponding signal from control unit 5 of transmission 4 to controller 18 of electric motor 3. Controller 18 may regulate the supply of current to electric motor 3 and thus control the rotational speed value of electric motor 3. The rotational speed value is a setpoint rotational speed value.

A certain position of rotary switch 14 of operating device 7 transmits a signal to actuator 12, so that actuator 12 converts the received signal into a certain mechanical movement of shift fork 13. The movement of shift fork 13 induces a shifting from one gear into another gear in transmission 4.

Figure 8:
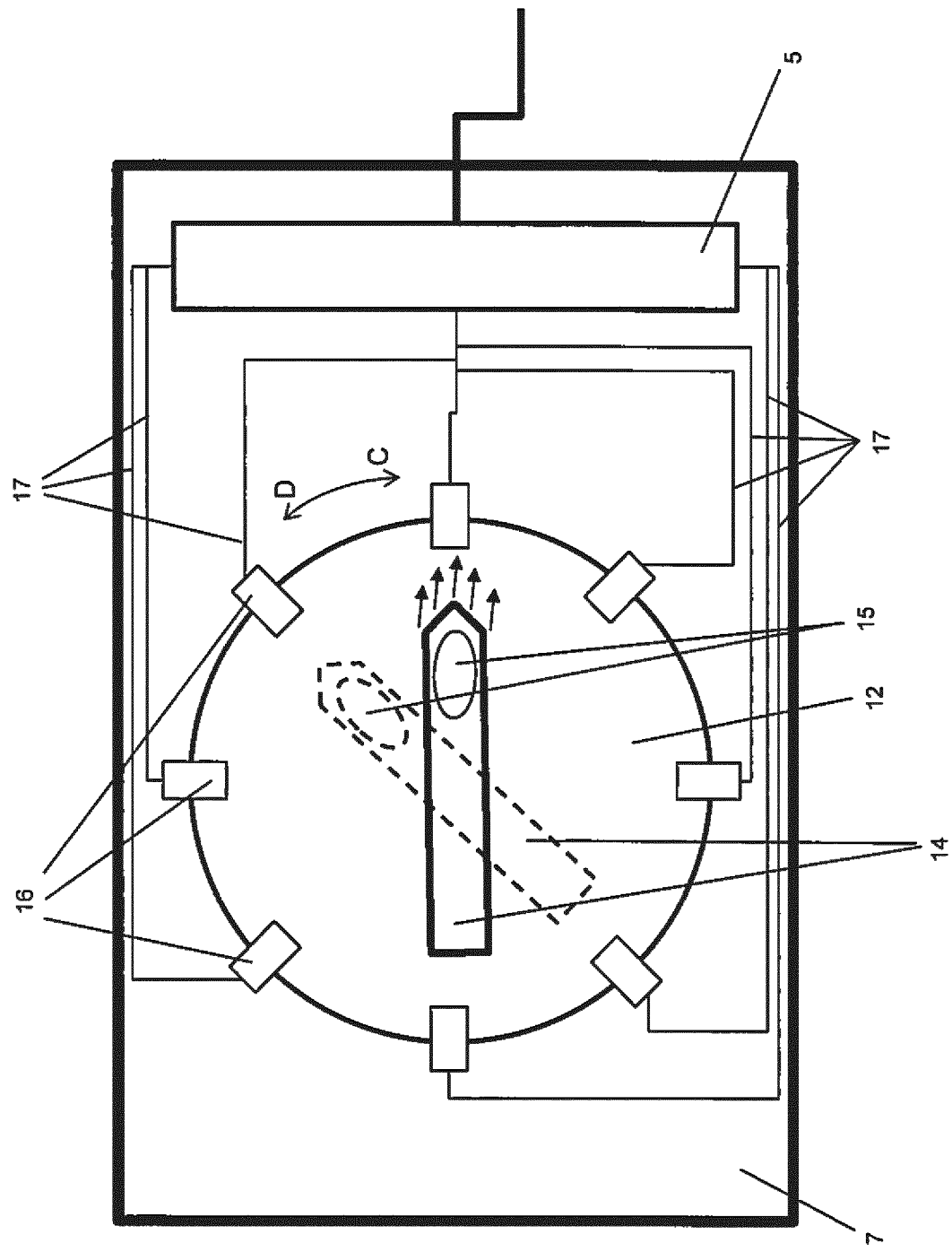
FIG. 8 shows the rotary switch of the operating device, which is moved from a first position into a second position.

If rotary switch 14 is rotated from a first position into a second position in direction C, as illustrated in FIG. 8, to move operating device 7 from a first position into a second position to select a gear in transmission 4, a signal is transmitted by signal transmitter 15 and received by sensor 16. The signal is transmitted to control unit 5. Control unit 5 detects the position of rotary switch 14, so that a corresponding signal is generated by control unit 5 and transmitted to controller 18. The rotational position of rotary switch 14 illustrated in FIG. 8 causes controller 18 to increase the rotational speed of electric motor 3.

If rotary switch 14 is rotated back from the second position into the first position in direction D, this position is detected by sensor 16, and a corresponding signal is transmitted to controller 18 via control unit 5 so that the rotational speed of electric motor 3 is reduced.

By changing the rotational speed setpoint value of electric motor 3, an additional spread for transmission 4 may therefore be achieved without a mechanical gear change, i.e. without a new toothed wheel constellation.

Figure 9:
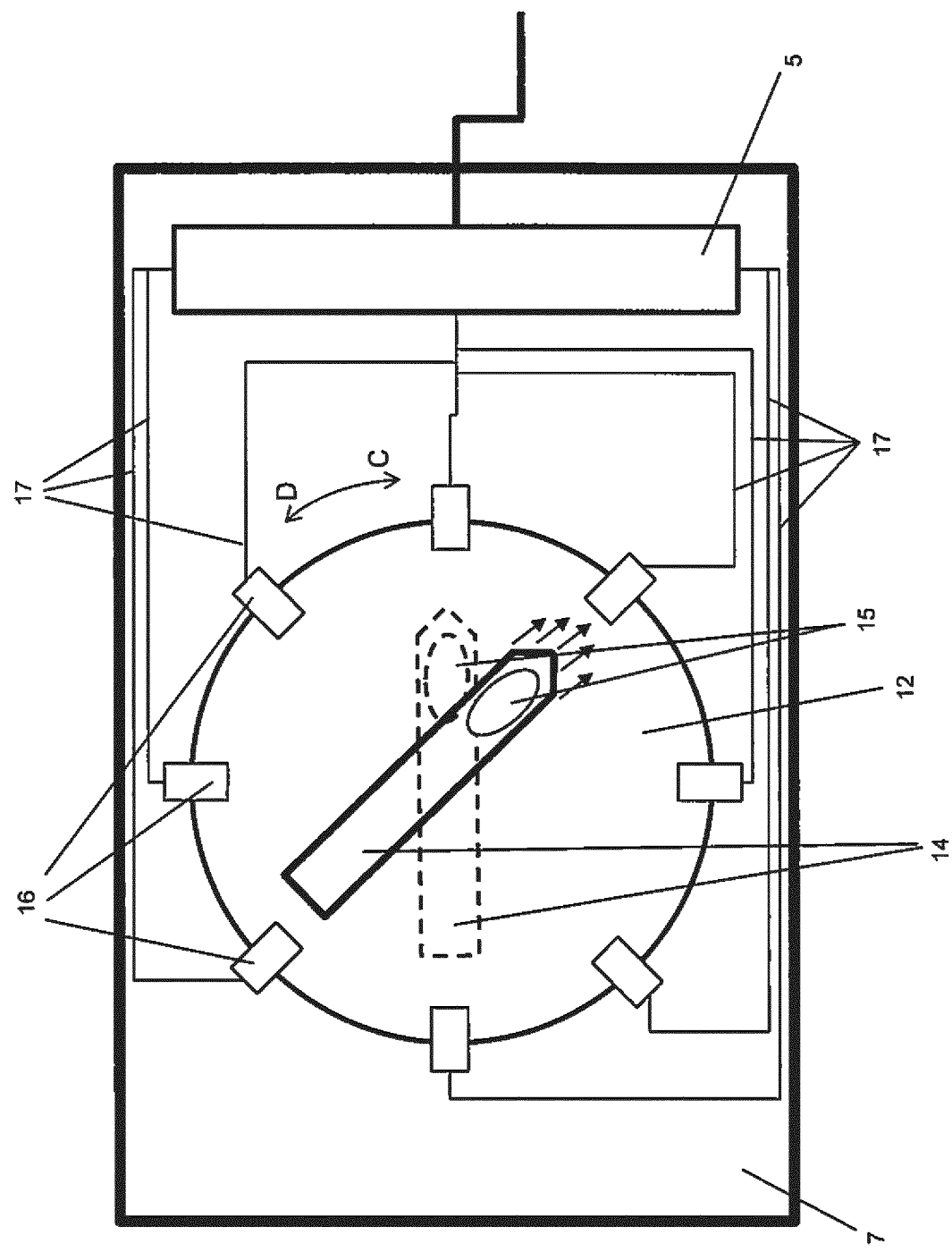
FIG. 9 shows the rotary switch of the operating device, which is moved from a second position into a third position.

If rotary switch 14 is further rotated from the second position into a third position in direction C, as illustrated in FIG. 9, to move operating device 7 from the second position into a third position to select a gear in transmission 4, a signal is transmitted by signal transmitter 15 and received by sensor 16. The signal is transmitted to control unit 5. Control unit 5 detects the position of rotary switch 14, so that a corresponding signal is generated by control unit 5 and transmitted to actuator 12. The rotational position of rotary switch 14 illustrated in FIG. 9 causes actuator 12 to move shift fork 13 in direction A, so that toothed wheels 10 in transmission 4 are placed into a different constellation. A new (i.e. higher) gear is engaged by the new constellation of toothed wheels 10 with respect to each other.

If rotary switch 14 is now rotated back from the third position into the second position in direction D, this position is detected by sensor 16, and a corresponding signal is transmitted to actuator 12 via control unit 5. Actuator 12 causes shift fork 13 to be moved in direction B, so that toothed wheels 10 in transmission 4 are placed into a different constellation. A new (i.e. lower) gear is engaged by the new constellation of toothed wheels 10 with respect to each other.

According to an alternative embodiment, a shifting energy store may also be included in transmission 4. The shifting energy store may be designed as a spring mechanism or a spring. Due to the shifting energy store designed as a spring mechanism, a force is applied to shift fork 13 to pretension shift fork 13 for a transition from a first position into a second position. The shifting energy store is not illustrated in the figures.

If the linear movement of shift fork 13 is not possible due to the toothed wheel constellation within transmission 4, the shifting energy store designed as a spring mechanism is activated, which stores the kinetic energy in a pretension or spring pretension, so that a gear preselection is present. This means that the selected gear may be implemented only upon a restart or at a low rotational speed. As soon as the movement of shift fork 13 is possible, the gear preselected by the shifting energy store is engaged with the aid of shift fork 13, and the shifting energy store returns to the initial position, i.e. the non-tensioned position. The mechanism of the gear preselection is designed in such a way that it is possible to shift from the first to the highest selectable gear without producing an alignment within the shifting mechanism.

REFERENCE NUMERALS

1 power tool
2 housing of the power tool
3 electric motor
4 transmission
5 control unit
6 output shaft
7 operating device
8 tool holder
9 power cord
10 toothed wheels
11 housing of the transmission
12 actuator
13 shift fork
14 rotary switch
15 signal transmitter
16 sensor
17 cable
18 controller

What is claimed is:

1. A method for setting a gear in a transmission of a power tool, the power tool including an electric motor for generating and transmitting a torque to the transmission as well as a controller for setting a rotational speed of the electric motor, and the transmission including an operating device for selecting the gear in the transmission, a shift fork as well as an actuator for converting a first signal into a mechanical movement of the shift fork, the operating device including at least one signal transmitter as well as at least one sensor for receiving at least one signal of the at least one signal transmitter, the method comprising the steps of:
    setting the operating device from a first operating device position to a second operating device position for selecting the gear;
    detecting the at least one signal by the at least one sensor according to the second position of the operating device;
    transmitting at least one sensor signal to the controller;
    setting the rotational speed of the electric motor from a first value to a second value with the aid of the controller;
    positioning the operating device from the second operating device position to a third operating device position;
    detecting the at least one signal via the at least one sensor according to the third operating device position;
    transmitting a first signal corresponding to the at least one sensor signal to the actuator; and setting the shift fork with the aid of the actuator from a first shift fork position to a second shift fork position for changing from a first gear to a second gear.

2. A power tool for carrying out the method as recited in claim 1, the power tool comprising the transmission, the electric motor for generating and transmitting the torque to the transmission, the controller for setting the rotational speed of the electric motor, the operating device for selecting the gear in the transmission, the shift fork for engaging the gear in the transmission and the actuator for converting the first signal into a mechanical movement of the shift fork, the operating device including the at least one signal transmitter and the at least one sensor for receiving the at least one signal of the at least one signal transmitter.

3. The power tool as recited in claim 2 wherein the signal transmitter is designed in the form of a magnet, and the sensor is designed in the form of a Hall sensor.

4. The power tool as recited in claim 2 wherein a shifting energy store is contained in the transmission, a force applicable to a shift fork of the transmission to pretension the shift fork for a transition from a first position into a second position.

5. A transmission for a power tool having an electric motor for generating and transmitting a torque to the transmission as well as a controller for setting a rotational speed of the electric motor, the transmission comprising:

an operating device for selecting a gear in the transmission, a shift fork as well as an actuator for converting a first signal into a mechanical movement of the shift fork, the operating device including at least one signal transmitter as well as at least one sensor for receiving at least one signal of the at least one signal transmitter, the transmission for the power tool being capable of carrying out the steps of:

setting the operating device from a first operating device position to a second operating device position for selecting the gear;

detecting the at least one signal by the at least one sensor according to the second position of the operating device;

transmitting at least one sensor signal to the controller;

setting the rotational speed of the electric motor from a first value to a second value with the aid of a controller;

positioning the operating device from the second operating device position to a third operating device position;

detecting the at least one signal via the at least one sensor according to the third operating device position;

transmitting a first signal corresponding to the at least one sensor signal to the actuator; and setting the shift fork with the aid of the actuator from a first shift fork position to a second shift fork position for changing from a first gear to a second gear.

6. A core drill comprising the transmission as recited in claim 5.

7. A core drill comprising the power tool as recited in claim 2.

8. The method as recited in claim 1 wherein the power tool is a core drill.

* * * * *